US011655190B2

United States Patent
Ohgi et al.

(10) Patent No.: US 11,655,190 B2
(45) Date of Patent: May 23, 2023

(54) HYDRAULIC COMPOSITION FOR ADDITIVE MANUFACTURING DEVICE, AND PROCESS FOR PRODUCING CASTING MOLD

(71) Applicant: TAIHEIYO CEMENT CORPORATION, Tokyo (JP)

(72) Inventors: Yoshifumi Ohgi, Sakura (JP); Yoji Ogawa, Sakura (JP); Makoto Tanimura, Sakura (JP); Atsuya Toba, Sapporo (JP); Hayato Suzuki, Sapporo (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 1118 days.

(21) Appl. No.: 16/465,929

(22) PCT Filed: Jun. 28, 2017

(86) PCT No.: PCT/JP2017/023690
§ 371 (c)(1),
(2) Date: May 31, 2019

(87) PCT Pub. No.: WO2018/003832
PCT Pub. Date: Jan. 4, 2018

(65) Prior Publication Data
US 2020/0039883 A1    Feb. 6, 2020

(30) Foreign Application Priority Data

Jun. 28, 2016 (JP) .............................. JP2016-127664
Nov. 30, 2016 (JP) .............................. JP2016-233143

(51) Int. Cl.
*C04B 28/06*    (2006.01)
*C04B 14/06*    (2006.01)
(Continued)

(52) U.S. Cl.
CPC .............. *C04B 28/06* (2013.01); *C04B 14/06* (2013.01); *C04B 14/365* (2013.01); *B33Y 10/00* (2014.12); *B33Y 70/00* (2014.12); *B33Y 80/00* (2014.12)

(58) Field of Classification Search
CPC ....... C04B 28/06; C04B 14/06; C04B 14/365; C04B 7/34; C04B 7/00; C04B 28/00;
(Continued)

(56) References Cited

U.S. PATENT DOCUMENTS 4,715,895 A    12/1987 Schnippering et al.
2012/0167804 A1*  7/2012 Perez-Pena ........... C04B 18/027
106/677

(Continued)

FOREIGN PATENT DOCUMENTS

CN    105837115 A  *  8/2016
JP    58-84637 A       5/1983
(Continued)

OTHER PUBLICATIONS

Kondo, "2 Production Method," Concrete Journal, vol. 6, No. 12, Dec. 1968, pp. 4-8 (and partial English translation attached).
(Continued)

*Primary Examiner* — James E McDonough
(74) *Attorney, Agent, or Firm* — Posz Law Group, PLC

(57) ABSTRACT

The present invention has solved the problems of conventional molding materials, and provides a hydraulic composition for additive manufacturing devices having high strength development, particularly high early strength development, and less generation of gas defect and graphite spheroidization defect. Specifically, the hydraulic composition for additive manufacturing devices of the present invention at least contains calcium aluminate. It is preferable that the hydraulic composition contain 0.5-10 parts by mass of (Continued)

Example 15 gypsum with respect to 100 parts by mass of the calcium aluminate.

18 Claims, 3 Drawing Sheets

(51) Int. Cl.
    *C04B 14/36*     (2006.01)
    *B33Y 10/00*     (2015.01)
    *B33Y 70/00*     (2020.01)
    *B33Y 80/00*     (2015.01)
    *C04B 7/34*     (2006.01)
    *C04B 7/00*     (2006.01)
    *C04B 28/00*     (2006.01)
    *C04B 32/00*     (2006.01)
    *C04B 7/32*     (2006.01)
    *C04B 7/36*     (2006.01)
    *C04B 9/11*     (2006.01)
    *C04B 11/28*     (2006.01)

(58) Field of Classification Search
    CPC .. C04B 32/00; C04B 7/32; C04B 7/36; C04B 9/11; C04B 11/28; B33Y 10/00; B33Y 70/00; B33Y 80/00
    USPC ................................................. 106/638, 692
    See application file for complete search history.

(56) References Cited

U.S. PATENT DOCUMENTS

| | | | |
|---|---|---|---|
| 2015/0041098 A1* | 2/2015 | McGuire | B22C 1/22 106/696 |
| 2018/0050963 A1* | 2/2018 | Hesse | C04B 28/146 |
| 2018/0127315 A1* | 5/2018 | Brigandat | C04B 28/065 |
| 2018/0148629 A1* | 5/2018 | Pisklak | E21B 33/14 |
| 2018/0186651 A1* | 7/2018 | Valero | C01F 7/164 |

FOREIGN PATENT DOCUMENTS

| | | |
|---|---|---|
| JP | 2007-297250 A | 11/2007 |
| JP | 2009-167042 A | 7/2009 |
| JP | 2010110802 A | 5/2010 |
| JP | 2011-51010 A | 3/2011 |
| JP | 5867938 B1 | 2/2016 |
| JP | 5867939 B1 | 2/2016 |
| WO | 2013/054833 A1 | 4/2013 |
| WO | 2014/186769 A1 | 11/2014 |

OTHER PUBLICATIONS

Maier et al., "Three-dimensional printing of flash-setting calcium aluminate cement," Journal of Material Science, 2011, vol. 46, pp. 2947-2954, published online, Springer Science + Business Media, LLC.
Higuchi et al., "Effect of Sodium Aluminate on Initial Hydration of Amorphous Calcium Aluminate," Journal of the Society of Inorganic Materials, Japan, 2004, vol. 11, pp. 92-97 (and partial English translation attached).
Nakagawa et al., "Influences of Glass Contents and Chemical Composition on the very early Hydration of Amorphous Calcium Aluminate," Gypsum & Lime, vol. 231, 1991, Japan, pp. 10-15 (and partial English translation attached).
Ochiai, "Fumed Silica," Journal of Aerosol Research, vol. 5, No. 1, 1990, pp. 32-43 (and partial English translation attached).
International Preliminary Report on Patentability dated Jan. 1, 2019 issued in corresponding international patent application No. PCT/JP2017/023690.
First Machine Industry Part Technical Information Place.
New-Style Construction Material.
Extended European Search Report dated Mar. 11, 2020 in the corresponding EP patent application No. 17820186.9.
Office action dated Feb. 3, 2020 in the corresponding CN patent application No. 201780051203.5.

* cited by examiner

HYDRAULIC COMPOSITION FOR ADDITIVE MANUFACTURING DEVICE, AND PROCESS FOR PRODUCING CASTING MOLD

CROSS REFERENCE TO RELATED APPLICATIONS

The present disclosure is a U.S. national stage application of PCT/JP2017/023690 filed on Jun. 28, 2017 and is based on Japanese Patent Application Nos. 2016-127664 filed on Jun. 28, 2016 and 2016-233143 filed on Nov. 30, 2016, the disclosures of which are incorporated herein by reference.

TECHNICAL FIELD

The present invention relates to a hydraulic composition for an additive manufacturing device for producing a molded product by using an additive manufacturing device (3D printer), and a process for producing a casting mold by using the composition.

BACKGROUND ART

A casting process is a traditional metal processing method which produces a casting by injecting molten metal into a casting mold. A self-hardening casting mold used for the casting process has an organic type and an inorganic type according to a caking material (binder) used. Among them, the inorganic type has mainly a water glass type and a cement type. However, in the cement type self-hardening casting mold, contained gypsum is thermally decomposed to generate gas according to a casting temperature, defects occur in the casting, and the aesthetic appearance or function is impaired. In addition, in the production of the casting mold, production of a model or a wooden mold is essential as preprocessing, but the preprocessing requires time and cost.

Therefore, there is a need for a casting mold producing means which does not impair an aesthetic appearance and the like of a casting and does not require preprocessing.

Recently, additive manufacturing devices have attracted attention as a quick and precise shaping means. Among these additive manufacturing devices, for example, a powder laminating and forming device is a device which spreads powder on a flat surface, sprays an aqueous binder to the powder to solidify the powder, and sequentially laminates the solidified powder in a vertical direction to produce a shaped product. The feature of this device is that data of three-dimensional modeling created by three-dimensional CAD or the like is divided into a plurality of horizontal planes and the shapes of these horizontal planes are sequentially laminated to produce a molded product.

Therefore, if the casting mold can be produced by using the additive manufacturing device, the above-described preprocessing is unnecessary, and it is expected that work time and cost can be reduced.

For example, Patent Literature 1 proposes a powder material suitable for a binder injection method (powder lamination molding method). The material is a material in which a predetermined amount of rapid hardening cement as a caking material is mixed with refractory sand, such as silica sand, olivine sand, or artificial sand, and then kneaded. An aqueous binder is added to the material and solidified and laminated to produce a molded product. The molded product produced by the binder injection method is required to exhibit high early strength development and have high strength even at the time of producing the casting so as to prevent breakage at the time of transportation immediately after production and to secure the production amount and good product.

In addition, a molding material disclosed in Patent Literature 2 is a molding material in a powder fixing and laminating method, in which an aggregate and a powdery precursor of a binder for binding the aggregate are mixed. The aggregate is 70% by weight or more, and the powdery precursor is cement or the like.

However, since the cement contains a relatively large amount of gypsum, when the above-mentioned molding material containing a large amount of cement is used as the casting mold, gas such as sulfur oxide is generated under high temperature, defects such as blow holes may easily occur, and defects due to graphite spheroidization inhibition may occur.

As such, when a cement-based material is used as a material for producing a casting mold for an additive manufacturing device, there is a high risk that casting defect due to gas such as sulfur oxide or poor graphite spheroidization will be generated, and early strength development is not sufficient.

In addition, design molded products, parts, or the like have been produced by a binder injection method using gypsum as a molding material from before. When gypsum is used as a molding material, since the molded product is white, coloring is easy and it is excellent in aesthetic property. However, it is necessary to leave it for about 1 hour after modeling so as to obtain strength to withstand depowder, since initial strength development is low. On the other hand, since the materials disclosed in Patent Literature 1 and Patent Literature 2 are colored, arbitrary coloring is difficult. Therefore, similarly to the material for the casting mold, there is a need for a material for a design molded product, in which initial strength development and product (molded product) strength are high and the material itself is white.

CITATION LIST

Patent Literature

Patent Literature 1: JP 2011-51010 A
Patent Literature 2: JP 2010-110802 A

SUMMARY OF INVENTION

Technical Problem

Therefore, the present invention has be made in an effort to solve the above-described problems of the conventional molding material, and an object of the present invention is to provide a hydraulic composition and the like for an additive manufacturing device having high strength development, particularly high early strength development, and less generation of gas defect and graphite spheroidization defect in casting production.

Solution to Problem

As a result of intensive studies to solve the above-described problems, the present inventors have found that a hydraulic composition for an additive manufacturing device which includes at least calcium aluminate can solve the above-described problems, and completed the present invention.

That is, the present invention is a hydraulic composition and the like for an additive manufacturing device having the following configuration.

[1] A hydraulic composition for an additive manufacturing device, comprising at least calcium aluminate.

[2] The hydraulic composition for an additive manufacturing device according to [1], wherein 0.5 to 10 parts by mass of gypsum is contained with respect to 100 parts by mass of the calcium aluminate.

[3] The hydraulic composition for an additive manufacturing device according to [2], wherein the gypsum is gypsum which is in a state of being contained in cement.

[4] The hydraulic composition for an additive manufacturing device according to any one of claims [1] to [3], wherein 100 to 400 parts by mass of sand is further contained with respect to 100 parts by mass of the calcium aluminate.

[5] The hydraulic composition for an additive manufacturing device according to claim [1], wherein 100 to 400 parts by mass of sand is contained with respect to 100 parts by mass of a binder containing at least 50 to 100% by mass of (A) the following calcium aluminate and 0 to 50% by mass of (B) the following cement:

(A) calcium aluminate: a molar ratio of $CaO/Al_2O_3$ is 1.5 to 3.0; and (B) cement: a content of calcium silicate is 25% by mass or more (a total content of the calcium aluminate and the cement is 100% by mass).

[6] The hydraulic composition for an additive manufacturing device according to any one of claims [3] to [8], wherein a setting (initial set) of the cement measured according to JIS R5210 is within 3 hours 30 minutes.

[7] The hydraulic composition for an additive manufacturing device according to any one of claims [4] to [6], wherein the sand is one or more selected from silica sand, olivine sand, and artificial sand.

[8] The hydraulic composition for an additive manufacturing device according to any one of claims [1] to [7], further comprising, as a hardening accelerator, one or more selected from alkali metal carbonate salt, alkali metal lactate salt, alkaline earth metal lactate salt, and alkali metal silicate salt.

[9] The hydraulic composition for an additive manufacturing device according to any one of claims [1] to [8], wherein the calcium aluminate is amorphous calcium aluminate.

[10] The hydraulic composition for an additive manufacturing device according to any one of claims [1] to [9], wherein 0.1 to 1.0% by mass of hydrophobic fumed silica is contained.

[11] A process for producing a casting mold, wherein the casting mold is produced by using an additive manufacturing device and the hydraulic composition for an additive manufacturing device according to any one of claims [1] to [10].

Advantageous Effects of Invention

A hydraulic composition for an additive manufacturing device according to the present invention has high strength development, particularly early strength development, and less generates gas defect and graphite spheroidization defect in casting production.

DESCRIPTION OF EMBODIMENTS

Figure 1:
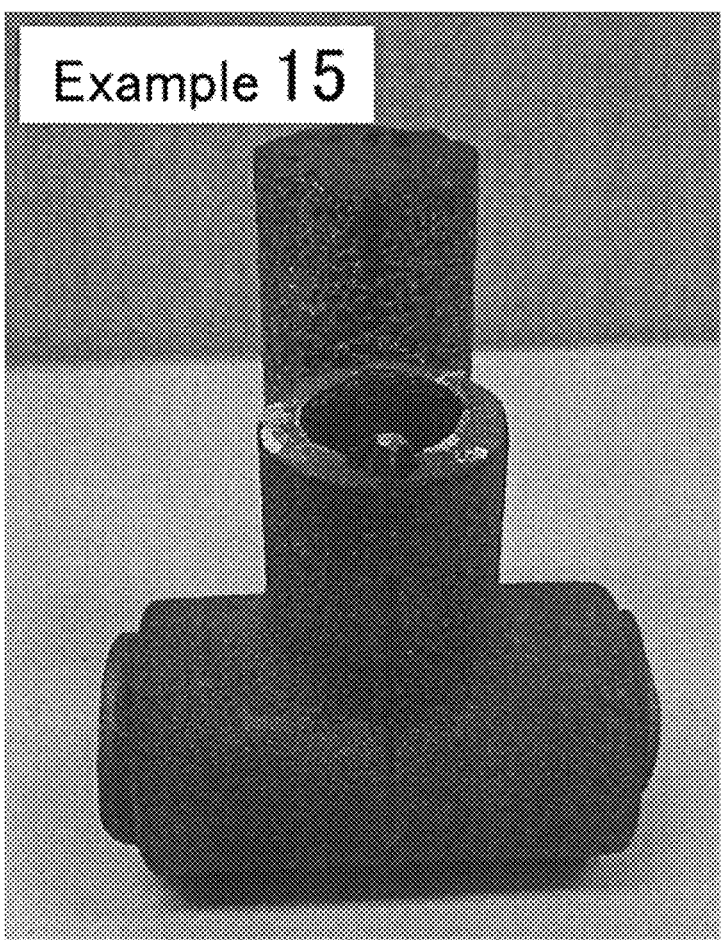
FIG. 1 is a photograph illustrating a casting (pipe) molded using a hydraulic composition for an additive manufacturing device of Example 15.
Figure 2:
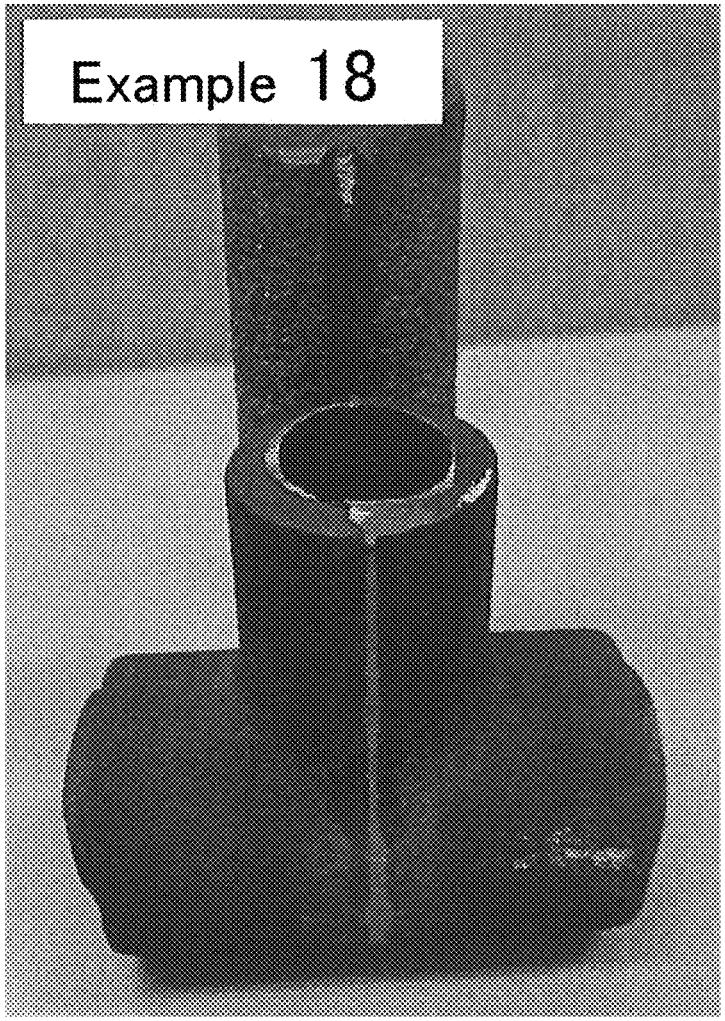
FIG. 2 is a photograph illustrating a casting (pipe) molded using a hydraulic composition for an additive manufacturing device of Example 18.
Figure 3:
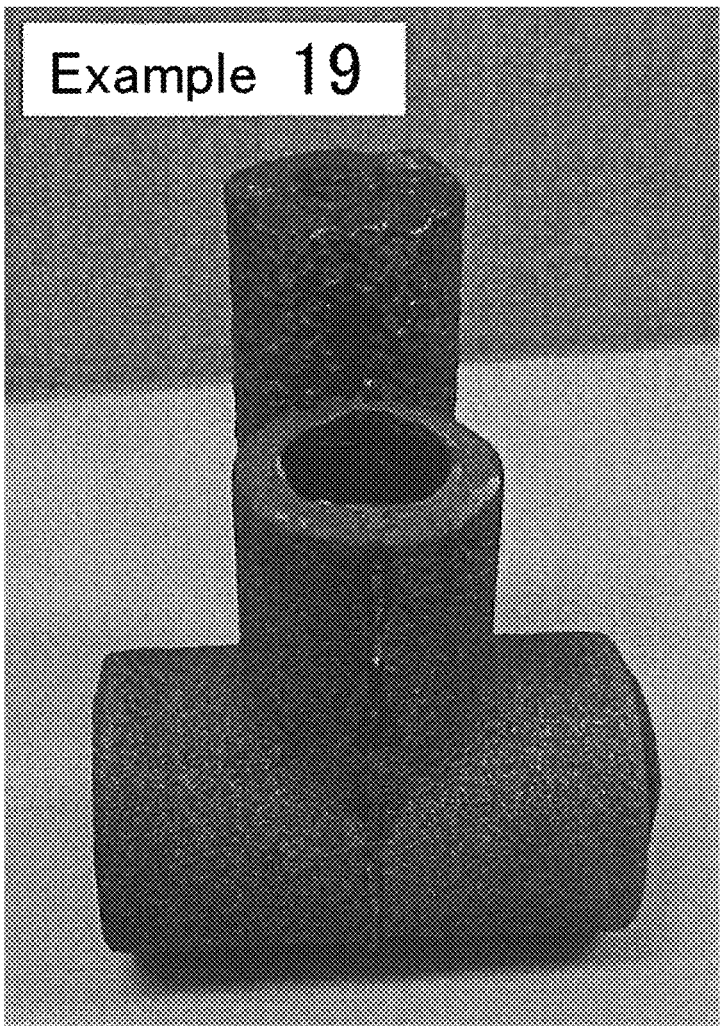
FIG. 3 is a photograph illustrating a casting (pipe) molded using a hydraulic composition for an additive manufacturing device of Example 19.

A hydraulic composition for an additive manufacturing device according to the present invention is a composition including at least calcium aluminate according to [1]. Furthermore, there are a hydraulic composition and the like for an additive manufacturing device according to [2] and a hydraulic composition for an additive manufacturing device according to [5].

Hereinafter, the hydraulic composition and the like for the additive manufacturing device according to the present invention will be described in detail.

1. Hydraulic Composition for Additive Manufacturing Device According to [1]

The hydraulic composition according to [1] is a hydraulic composition including at least calcium aluminate.

A molar ratio of $CaO/Al_2O_3$ of the calcium aluminate is 1.5 to 3.0, and preferably 1.7 to 2.4. When the molar ratio is 1.5 or more, the hydraulic composition for the additive manufacturing device has high early strength development, and when the molar ratio is 3.0 or less, the hydraulic composition for the additive manufacturing device has high heat resistance. The calcium aluminate having the above molar ratio is, for example, one or more selected from $12CaO·7Al_2O_3$, $3CaO·Al_2O_3$, $11CaO·7Al_2O_3·CaF_2$, $Na_2O·8CaO·3Al_2O_3$, amorphous calcium aluminate and the like. Among them, amorphous calcium aluminate is preferable since it is excellent in early strength development.

Here, the calcium aluminate includes CaO and $Al_2O_3$ as main components and can further include one or more selected from Na, K, S, and Fe. Since amorphous calcium aluminate is produced by melting a raw material and rapidly cooling the molten raw material, amorphous calcium aluminate has substantially no crystal structure, and a vitrification rate of amorphous calcium aluminate is usually 80% or more. As the vitrification rate is higher, early strength development is high. Therefore, the vitrification rate of amorphous calcium aluminate is preferably 90% or more.

In addition, a Blaine specific surface area of calcium aluminate is preferably 1,000 to 6,000 $cm^2/g$, and more preferably 1,500 to 5,000 $cm^2/g$ so as to obtain sufficient rapid hardness and suppress generation of dust.

Furthermore, when sand described later is not included, a Blaine specific surface area of calcium aluminate is preferably 1,000 to 2,500 $cm^2/g$, and more preferably 1,500 to 2,000 $cm^2/g$ so as to flatten the surface laid by the additive manufacturing device and not to reduce the strength of the casting mold. In addition, even when sand is 200 parts by mass or less with respect to a total of 100 parts by mass of calcium aluminate, gypsum, and cement, a Blaine specific surface area of calcium aluminate is preferably 1,000 to 2,500 $cm^2/g$, and more preferably 1,500 to 2,000 $cm^2/g$ so as to flatten the surface laid by the additive manufacturing device and not to reduce the strength of the casting mold.

2. Hydraulic Composition for Additive Manufacturing Device According to [2]

The hydraulic composition according to [2] is a composition including 0.5 to 10 parts by mass of gypsum with respect to 100 parts by mass of calcium aluminate. If the content of gypsum is within this range, occurrence of casting defect due to gas such as sulfur oxide and the like and graphite spheroidization defect can be suppressed, and early strength development is high. The content ratio of gypsum is preferably 1 to 8 parts by mass, and more preferably 1 to 7 parts by mass with respect to 100 parts by mass of calcium aluminate.

(1) Calcium Aluminate

The calcium aluminate is the same as the calcium aluminate used in the hydraulic composition according to [1] described in paragraph 0014.

(2) Gypsum

The gypsum is one or more selected from anhydrous gypsum, hemihydrate gypsum, and dihydrate gypsum. Among them, anhydrous gypsum is preferable since it is preferably higher in early strength development. In addition to natural anhydrous gypsum, recycled anhydrous gypsum produced by heating a waste material such as a waste gypsum board can be used as the anhydrous gypsum.

In addition, a Blaine specific surface area of gypsum is preferably 3,000 $cm^2/g$ or more, and more preferably 4,000 $cm^2/g$ or more, so as to secure early strength development.

When at least one of the Blaine specific surface areas of the calcium aluminate and the gypsum is high, sufficient early strength development can be obtained. Therefore, in order to increase early strength development, the sum of Blaine specific surface areas of the calcium aluminate and the gypsum (total of Blaine specific surface area values) is preferably 8,000 $cm^2/g$ or more. In order to suppress the production cost of the casting mold, it is preferable to reduce the Blaine specific surface area of the calcium aluminate and to increase the Blaine specific surface area of the gypsum.

When the hydraulic composition according to [2] is used as a material for producing a casting mold, the gypsum may be gypsum in a state of being included in cement. Gypsum in cement is generally present in the form of a mixture (mixed gypsum) of dihydrate gypsum and hemihydrate gypsum. Hemihydrate gypsum is produced by dehydration from dihydrate gypsum by heat generated by grinding cement. Therefore, the content ratio of hemihydrate gypsum and dihydrate gypsum is influenced by a grinding condition. Therefore, in order to mix the calcium aluminate and the cement such that 0.5 to 10 parts by mass of the gypsum is included with respect to 100 parts by mass of the calcium aluminate, about 25 parts by mass or less of the cement may be mixed with 100 parts by mass of the calcium aluminate. If cement clinker powder coexists in addition to gypsum alone, medium- and long-term strength development after 1-day material age is further improved. Such cement includes one or more selected from rapid hardening cement, ultrarapid hardening cement, ordinary Portland cement, high-early strength Portland cement, moderate heat Portland cement, low heat Portland cement, white Portland cement, ecocement, Portland blast-furnace slag cement, and Portland fly-ash cement.

In addition, when long-term strength development is particularly required, the content of calcium silicate in cement is preferably 45% by mass or more. In addition, as long as the cement has a setting (initial set) measured according to JIS R5210 is within 3 hours 30 minutes, preferably 1 hour, early strength development after 3 hours from the production of the casting mold is also high. Therefore, the cement is preferably ordinary Portland cement, early strength Portland cement, rapid hardening cement, and ultrarapid hardening cement. Examples of commercially available products of rapid hardening cement and ultrarapid hardening cement include Super Jet Cement (registered trademark, manufactured by Onoda Kemiko), Jet Cement (registered trademark, manufactured by Sumitomo Osaka Cement Co., Ltd.), and Denka Super Cement (manufactured by Denka Co., Ltd.).

When the hydraulic composition according to [2] is used as a material for a design molded product, it is preferable to use gypsum itself (alone) rather than gypsum in a state of being included in cement. However, when white color cement such as white cement is used, gypsum in a state of being included in the cement may be used.

(3) Hardening Accelerator

The hydraulic composition according to [1] to [4] may further include a hardening accelerator as an optional component in an amount of 1 to 15 parts by mass with respect to 100 parts by mass of the calcium aluminate. When the hardening accelerator is within this range, the early strength development is further improved. The content of the hardening accelerator is preferably 2 to 13 parts by mass, and more preferably 3 to 12 parts by mass, with respect to 100 parts by mass of the calcium aluminate.

The hardening accelerator used in the present invention is one or more selected from alkali metal carbonate salt, alkali metal lactate salt, alkaline earth metal lactate salt, and alkali metal silicate salt.

(i) The alkali metal carbonate salt includes one or more selected from sodium carbonate, potassium carbonate, and lithium carbonate.

(ii) The alkali metal lactate salt includes one or more selected from sodium lactate, potassium lactate, and lithium lactate.

(iii) The alkaline earth metal lactate salt includes one or more selected from calcium lactate and magnesium lactate.

(iv) The alkali metal silicate salt includes one or more selected from sodium silicate, potassium silicate, and lithium silicate.

Besides the previous mixing with the material for producing the casting mold, the hardening accelerator may be dissolved in water supplied from the additive manufacturing device and then used.

(4) Sand

When the hydraulic composition according to [1] to [3] is used as the material for producing the casting mold, 100 to 400 parts by mass of casting sand may be included with respect to 100 parts by mass of the calcium aluminate. The sand for the casting is preferably one or more selected from silica sand, olivine sand, and artificial sand. Since silica sand, olivine sand, and artificial sand have high fire resistance, it is possible to secure fire resistance and early strength development of the casting mold when the content of the silica sand and the like is within the above range. The content is more preferably 150 to 300 parts by mass, and further more preferably 180 to 250 parts by mass, with respect to 100 parts by mass of the calcium aluminate.

In addition, when the hydraulic composition according to [1] to [3] is used as the material for the design molded product, 100 to 400 parts by mass of white sand may be further included with respect to 100 parts by mass of the calcium aluminate. The white sand is one or more selected from high purity silica sand, limestone sand, and artificial sand. Since high purity silica sand, limestone sand, and artificial sand have high whiteness, it is easy to color the design molded product and the aesthetic appearance of the design molded product is improved. The content is more preferably 150 to 300 parts by mass, and further more preferably 180 to 250 parts by mass, with respect to 100 parts by mass of the calcium aluminate.

3. Hydraulic Composition for Additive Manufacturing Device According to [5]

The hydraulic composition according to [5] is a hydraulic composition including 100 to 400 parts by mass of sand with respect to 100 parts by mass of a binder containing at least 50 to 100% by mass of (A) the following calcium aluminate and 0 to 50% by mass of (B) the following cement:

(A) calcium aluminate: a molar ratio of $CaO/Al_2O_3$ is 1.5 to 3.0; and (B) cement: a content of calcium silicate is 25% by mass or more (a total content of the calcium aluminate and the cement is 100% by mass).

When the content of the (A) calcium aluminate is 50 to 100% by mass on the assumption that the total content of the calcium aluminate and the cement is 100% by mass, the strength development and the heat resistance are high. The value is preferably 60 to 100% by mass, more preferably 70 to 100% by mass, and further preferably 80 to 95% by mass.

In addition, when the content of the cement is 50% by mass or less, the rapid hardness of the hydraulic composition according to [5] is high. The value is preferably 0 to 40% by mass, more preferably 0 to 30% by mass, and further preferably 5 to 20% by mass.

(1) (A) Calcium Aluminate

The type and the Blaine specific surface area of the (A) calcium aluminate are the same as those of the calcium aluminate used in the hydraulic composition according to [1]. In addition, a molar ratio of $CaO/Al_2O_3$ of the (A) calcium aluminate is preferably 1.5 to 3.0, and more preferably 1.7 to 2.4. When the molar ratio is 1.5 or more, the hydraulic composition according to [5] has high initial strength, and when the molar ratio is 3.0 or less, the hydraulic composition has high heat resistance.

(2) (B) Cement

In the (B) cement, the content of calcium silicate is 25% by mass or more. When the content is 25% by mass or more, strength development is high over a long period of one day or more. When long-term strength development is required, the content of calcium silicate in cement is preferably 45% by mass or more. In addition, as long as the cement has a setting (initial set) measured according to JIS R5210 is within 3 hours 30 minutes, initial strength development after 3 hours from the production of the casting mold is also high. When initial strength development is required, cement with a setting (initial set) within 1 hour is preferably used. The cement used in the hydraulic composition according to [5] may be one or more selected from cement clinker powders, in addition to the cement exemplified in paragraph 0019. In the present invention, the cement clinker powder is also included in the cement.

Among these cements, ordinary Portland cement, high-early strength Portland cement, rapid hardening cement, and ultrarapid hardening cement are preferable due to high strength development. Commercially available products of rapid hardening cement or ultrarapid hardening cement include the commercially available products described in paragraph 0020.

(3) Sand

The type and amount of the sand used in the hydraulic composition according to [5] are the same as those used for the hydraulic composition described in paragraphs 0022 and 0023.

(4) Hardening Accelerator

The hydraulic composition according to [5] preferably further includes a hardening accelerator as an optional component so as to improve strength development. In addition, the content of the hardening accelerator in the hydraulic composition is the same as the hardening accelerator described in paragraph 0021. In particular, the hydraulic composition according to [5], in which the content of the cement is 30 to 50% by mass, has a high effect of improving strength development by the hardening accelerator.

(5) Others

In order to facilitate the operation (depowder) of removing the unhardened powder of the hydraulic composition left after molding from the molded product, the hydraulic composition for the additive manufacturing device according to [1] to [9] may further include 0.1 to 1.0% by mass of hydrophobic fumed silica. The hydrophobic fumed silica is a silica powder, the surface of which is rendered hydrophobic by treating the surface of the fumed silica with silane or siloxane. The BET specific surface area of the hydrophobic fumed silica is preferably 30 to 300 $m^2/g$ so as to further enhance the removal efficiency of the powder of the hydraulic composition. In addition, the hydrophobic fumed silica has improved flowability of the powder, the surface laid by the additive manufacturing device becomes flat, the density of the casting mold lowers without decreasing the strength, and the air permeability is improved. In addition, the hydrophobic fumed silica is effective for preventing the solidification of the powder and improving the mixing property.

In addition, the hydraulic composition for the additive manufacturing device according to [1] to [10] may include an optional component such as blast furnace slag, fly ash, silica fume, silica fine powder, or limestone powder as an adjusting material for strength development or the like.

6. Process for Producing Casting Mold

The producing process is a method for molding a casting mold by using an additive manufacturing device and a hydraulic composition for an additive manufacturing device according to the present invention. The hydraulic composition for an additive manufacturing device according to the present invention is prepared by mixing the above materials with a commercially available mixer or by hand and a casting mold is produced by an additive manufacturing device. The additive manufacturing device is not particularly limited, and a commercially available product such as a powder laminate type additive manufacturing device or the like can be used.

In addition, in the process for producing the casting mold according to the present invention, from the viewpoint of the generation of water vapor at the time of production of the casting and the strength of the casting mold, a mass ratio of water to hydraulic composition is preferably 0.01 to 0.1, more preferably 0.02 to 0.09, and further more preferably 0.03 to 0.08.

In the process for producing the casting mold according to the present invention, the method for curing the casting mold includes atmospheric curing alone, underwater curing subsequently to atmospheric curing, surface impregnating agent curing, or the like. The three types of curing temperature are not particularly limited, but are preferably 10 to 50° C. in view of ease of curing.

From the viewpoint of sufficient strength development and production efficiency, the atmospheric curing time is preferably 0.5 to 5 hours, more preferably 1 to 4 hours, and further preferably 2 to 4 hours, and the underwater curing time is preferably 5 hours or more, more preferably 10 hours or more, and further preferably 20 hours or more.

The surface impregnating agent curing is a curing which enhances the strength of the molded product by immersing the molded product in an alkali silicate aqueous solution, silica sol, colloidal silica, ethyl silicate, or methyl silicate.

The alkali silicate in the alkali silicate aqueous solution is preferably sodium silicate and/or potassium silicate. The content of the alkali silicate in the alkali silicate aqueous solution is preferably 10 to 40% by mass. When the content is less than 10% by mass, the permeation amount of the alkali silicate may be insufficient and the strength enhancement effect may be small, and when the content exceeds 40% by mass, the viscosity of the alkali silicate aqueous solution may be increased and the permeability may be decreased. The content is more preferably 20 to 35% by mass.

The curing time of the surface impregnating agent curing is preferably 0.5 hours to 48 hours. When the time is shorter than 0.5 hours, the curing is insufficient, and when the time exceeds 48 hours, the strength enhancement effect tends to be saturated. From the viewpoint of production efficiency, the curing time of the surface impregnating agent curing is more preferably 1 to 24 hours.

After the curing or the impregnation, if the casting mold is fired, the volatile components can be reduced and defects of the casting can be suppressed. The firing temperature is preferably 200° C. to 1,500° C. and the firing time is preferably 1 to 48 hours.

EXAMPLES

Hereinafter, the present invention will be described with reference to examples, but the present invention is not limited to these examples.

1. Materials Used (1) Amorphous Calcium Aluminate (abbreviation: CA)

The Blaine specific surface area (abbreviation: BL) of the calcium aluminate (trial product) is 1,500 cm$^2$/g, 2,000 cm$^2$/g, 3,000 cm$^2$/g, 3,800 cm$^2$/g, and 5,000 cm$^2$/g, the molar ratio of $CaO/A_2O_3$ of the calcium aluminate is all 2.2, and the vitrification rate of the calcium aluminate is all 95% or more. In addition, in the calcium aluminate, an XRD peak is observed, but this is caused by crystalline $12CaO \cdot 7Al_2O_3$ which exists in such a small amount as not to be quantified.

(2) Gypsum

The gypsum is natural anhydrous gypsum (Thai product), and the Blaine specific surface area is 4,350 cm$^2$/g and 7,200 cm$^2$/g.

(3) Hardening Accelerator (i) Lithium carbonate (abbreviation: LC, reagent grade 1, manufactured by Kanto Kagaku Co., INC.)

(ii) Calcium lactate (abbreviation: CL, reagent grade 1, manufactured by Kanto Kagaku Co., INC.)

(4) Cement (i) Super jet cement (abbreviation: SJC, ultrarapid hardening cement, registered trademark, manufactured by Onoda Kemiko Chemico co., ltd)

The content of the calcium silicate in the super jet cement is 47% by mass, the setting (initial set) is within 30 minutes, and the Blaine specific surface area is 4,700 cm$^2$/g. The gypsum included in the super jet cement is anhydrous gypsum.

(ii) High-early strength Portland cement (abbreviation: HC, manufactured by TAIHEIYO CEMENT CORPORATION.)

The content of the calcium silicate in the high-early strength Portland cement is 75% by mass, the setting (initial set) is 1 hour 40 minutes, and the Blaine specific surface area is 4,300 cm$^2$/g. The mass ratio of hemihydrate gypsum to dihydrate gypsum of gypsum included in high-early strength Portland cement is 6:4.

(iii) Ordinary Portland cement (abbreviation: NC, manufactured by TAIHEIYO CEMENT CORPORATION.)

The content of the calcium silicate is 74% by mass, the setting (initial set) is 2 hours 15 minutes, and the Blaine specific surface area is 3,300 cm$^2$/g.

(5) Sand (i) Natural casting sand A: silica sand #8 (abbreviation: natural (A), manufactured by TOHOKU KEISYA Co., Ltd)

(ii) Natural casting sand B: Alumina sand #7 (abbreviation: natural (B), manufactured by ACE TRADING CO., LTD.)

(iii) Natural casting sand C: alumina sand #200 (abbreviation: natural (C), manufactured by ACE TRADING CO., LTD.)

(iv) Artificial casting sand A: alumina type, trade name Esper #180L (abbreviation: artificial (A), manufactured by Yamakawa Sangyo Co., Ltd.)

(v) Artificial casting sand B: alumina type, trade name Celabeads 1450 (abbreviation: artificial (B), manufactured by ITOCHU CERATECH CORP.)

(6) Hydrophobic fumed silica (abbreviation: FS, manufactured by NIPPON AEROSIL CO., LTD.)

Product name AEROSIL RX200

(7) Tap Water

2. Preparation of Hydraulic Composition, Casting Mold, and Mortar Specimen

Calcium aluminate, cement, hardening accelerator, sand, and the like were mixed according to the compositions shown in Table 1 and Table 2 to prepare a hydraulic composition for producing a casting mold.

Next, a mortar specimen having dimensions of 10 mm in length, 16 mm in width, and 80 mm in length and a casting mold were prepared by a binder injection method by using a hydraulic composition and a binder injection type powder laminating device (product name: ZPrinter 310, manufactured by Z Corporation Inc.) as an additive manufacturing device.

In the process for producing the casting mold by using the device, a predetermined position of the hydraulic composition was selected, and a certain amount of water was sprayed from a nozzle to solidify the hydraulic composition. The mass ratio of the water to the hydraulic composition was 0.05.

3. Measurement of Flexural Strength of Mortar Specimen

Next, after atmospheric curing of the mortar specimen for 3 hours and 24 hours, a three-point bending test was performed by using a flexural strength of mortar specimen strength tester (model number: MODEL-2257, manufactured by AIKOH ENGINEERING CO., LTD), and the flexural strength of mortar specimen strength of the mortar specimen was measured. The results are shown in Table 1 and Table 2.

As shown in Table 1 and Table 2, the flexural strength of mortar specimen strengths after 3 hours and 24 hours are as high as 0.24 MPa (Example 1) to 0.65 MPa (Example 5) and 0.30 MPa (Example 14) to 0.78 MPa (Example 5) in Examples 1 to 34, and Examples 1 to 34 have practically sufficient early strength development.

4. Production of Casting

Next, molten cast iron having a molten metal temperature of about 1,600° C. was poured into the casting mold to produce a casting.

As shown in Table 1 and Table 2, in any of Examples, defects due to gas did not occur during casting, and a casting having a smooth surface could be produced. In contrast, Reference Example 1 in which 13 parts by mass of anhydrous gypsum is included in cement and Reference Example 2 in which the content of cement is 100% by mass (corresponding to the inventions disclosed in Patent Literatures 1 and 2) had sufficient strength, but gas was generated during casting, and it caused defects in the casting.

When the specimen with 24-hour material age, which was produced in Example 3, was heated in an electric furnace at 1,200° C. for 3 hours, the flexural strength of mortar specimen was 1.65 MPa and the strength was improved.

TABLE 1

| | Calcium aluminate (parts by mass) | | | | | Anhydrous gypsum (parts by mass) | | Gypsum in cement (parts by mass) | |
|---|---|---|---|---|---|---|---|---|---|
| | BL5000 | BL3800 | BL3000 | BL2000 | BL1500 | BL4350 | BL7200 | Anhydrous gypsum | Mixed gypsum |
| Example 1 | 100 | — | — | — | — | — | — | — | — |
| Example 2 | 100 | — | — | — | — | 1 | — | — | — |
| Example 3 | 100 | — | — | — | — | 2 | — | — | — |
| Example 4 | 100 | — | — | — | — | 3 | — | — | — |
| Example 5 | 100 | — | — | — | — | 3 | — | — | — |
| Example 6 | 100 | — | — | — | — | 7 | — | — | — |
| Example 7 | 100 | — | — | — | — | 10 | — | — | — |
| Example 8 | 100 | — | — | — | — | — | 3 | — | — |
| Example 9 | — | 100 | — | — | — | 2 | — | — | — |
| Example 10 | — | — | 100 | — | — | — | 3 | — | — |
| Example 11 | — | — | — | — | 100 | — | — | 1.4 | — |
| Example 12 | 100 | — | — | — | — | — | — | — | 0.5 |
| Example 13 | 100 | — | — | — | — | — | — | 1.4 | — |
| Reference Example 1 | — | — | — | — | — | — | — | 13 | — |

| | Hardening accelerator (parts by mass) | | Casting sand (parts by mass) | | Cement (parts by mass) | | Flexural strength (MPa) | | Presence or absence of casting defect |
|---|---|---|---|---|---|---|---|---|---|
| | LC | CL | Natural (A) | Artificial (A) | SJC | HC | After 3 hours | After 24 hours | |
| Example 1 | — | — | 200 | — | — | — | 0.24 | 0.35 | Absence |
| Example 2 | — | — | 200 | — | — | — | 0.40 | 0.68 | Absence |
| Example 3 | — | — | 200 | — | — | — | 0.50 | 0.63 | Absence |
| Example 4 | — | — | 200 | — | — | — | 0.33 | 0.56 | Absence |
| Example 5 | 4 | 4 | 200 | — | — | — | 0.65 | 0.78 | Absence |
| Example 6 | — | — | 200 | — | — | — | 0.43 | 0.57 | Absence |
| Example 7 | — | — | 200 | — | — | — | 0.37 | 0.51 | Absence |
| Example 8 | — | — | 200 | — | — | — | 0.33 | 0.58 | Absence |
| Example 9 | — | — | — | 200 | — | — | 0.50 | — | Absence |
| Example 10 | — | — | 200 | — | — | — | 0.33 | 0.59 | Absence |
| Example 11 | — | — | — | — | 11 | — | 0.27 | 0.41 | Absence |
| Example 12 | — | — | 222 | — | — | 11 | 0.35 | 0.52 | Absence |
| Example 13 | — | — | 222 | — | 11 | — | 0.31 | 0.68 | Absence |
| Reference Example 1 | — | — | 200 | — | 100 | — | 0.48 | 0.60 | Presence |

TABLE 1-continued

| | Hardening accelerator (parts by mass) | | Casting sand (parts by mass) | | Cement (parts by mass) | | Flexural strength (MPa) | | Presence or absence of casting defect |
|---|---|---|---|---|---|---|---|---|---|
| | LC | CL | Natural (A) | Artificial (A) | SJC | HC | After 3 hours | After 24 hours | |
| Example 1 | — | — | 200 | — | — | — | 0.24 | 0.35 | Absence |
| Example 2 | — | — | 200 | — | — | — | 0.40 | 0.68 | Absence |
| Example 3 | — | — | 200 | — | — | — | 0.50 | 0.63 | Absence |
| Example 4 | — | — | 200 | — | — | — | 0.33 | 0.56 | Absence |
| Example 5 | 4 | 4 | 200 | — | — | — | 0.65 | 0.78 | Absence |
| Example 6 | — | — | 200 | — | — | — | 0.43 | 0.57 | Absence |
| Example 7 | — | — | 200 | — | — | — | 0.37 | 0.51 | Absence |
| Example 8 | — | — | 200 | — | — | — | 0.33 | 0.58 | Absence |
| Example 9 | — | — | — | 200 | — | — | 0.50 | — | Absence |
| Example 10 | — | — | 200 | — | — | — | 0.33 | 0.59 | Absence |
| Example 11 | — | — | — | — | 11 | — | 0.27 | 0.41 | Absence |
| Example 12 | — | — | 222 | — | — | 11 | 0.35 | 0.52 | Absence |
| Example 13 | — | — | 222 | — | 11 | — | 0.31 | 0.68 | Absence |
| Reference Example 1 | — | — | 200 | — | 100 | — | 0.48 | 0.60 | Presence |

Note)
"Values" in "BL vales" represents the Braine specific surface area (cm$^2$/g).

Note)
0.5 parts by mass of mixed gypsum is included in 11 parts by mass of the HC used in Example 12.

Note)
1.4 parts by mass of anhydrous gypsum is included in 11 parts by mass of the SJC used in Example 11, 13.

Note)
13 parts by mass of anhydrous gypsum is included in 100 parts by mass of the SJC used in Reference Example 1.

TABLE 2

| | CA (parts by mass) | | | Cement (parts by mass) | | | Hardening accelerator (parts by mass) | | Sand (parts by mass) | |
|---|---|---|---|---|---|---|---|---|---|---|
| | BL5000 | BL2000 | BL1500 | SJC | HC | NC | LC | CL | Natural (A) | Natural (B) |
| Example 14 | 50 | — | — | — | 50 | — | — | — | 200 | — |
| Example 15 | 50 | — | — | — | 50 | — | 2 | 4 | 200 | — |
| Example 16 | 50 | — | — | — | 50 | — | 2 | 4 | — | — |
| Example 17 | 50 | — | — | 50 | — | — | — | — | 200 | — |
| Example 18 | 50 | — | — | 25 | 25 | — | 2 | 4 | 200 | — |
| Example 19 | 50 | — | — | 10 | 40 | — | 2 | 4 | 200 | — |
| Example 20 | 50 | — | — | 25 | — | 25 | 2 | 4 | 200 | — |
| Example 21 | 70 | — | — | — | 30 | — | — | — | 200 | — |
| Example 22 | 70 | — | — | — | 30 | — | — | — | — | — |
| Example 23 | 70 | — | — | — | — | 30 | — | — | 200 | — |
| Example 24 | 70 | — | — | 30 | — | — | — | — | 200 | — |
| Example 25 | 90 | — | — | — | 10 | — | — | — | 200 | — |
| Example 26 | 90 | — | — | 10 | — | — | — | — | 200 | — |
| Example 27 | 90 | — | — | 10 | — | — | — | — | — | 200 |
| Example 28 | 90 | — | — | 10 | — | — | — | — | — | — |
| Example 29 | 90 | — | — | 10 | — | — | — | — | — | — |
| Example 30 | 90 | — | — | 10 | — | — | — | — | — | — |
| Example 31 | — | 90 | — | 10 | — | — | — | — | — | — |
| Example 32 | — | — | 90 | 10 | — | — | — | — | — | — |
| Example 33 | — | — | 90 | 10 | — | — | — | — | — | — |
| Example 34 | — | — | 90 | 10 | — | — | — | — | — | — |
| Comparative Example | 30 | — | — | — | 70 | — | — | — | 200 | — |
| Reference Example 2 | — | — | — | 100 | — | — | — | — | 200 | — |

| | Sand (parts by mass) | | | Flexural strength (MPa) | | | Presence or absence of casting defect |
|---|---|---|---|---|---|---|---|
| | Natural (C) | Artificial (A) | Artificial (A + B) | Just after modeling | After 3 hours | After 24 hours | |
| Example 14 | — | — | — | 0.17 | 0.26 | 0.30 | Absence |
| Example 15 | — | — | — | 0.30 | — | 0.54 | Absence |
| Example 16 | — | 200 | — | 0.37 | — | 0.70 | Absence |
| Example 17 | — | — | — | 0.34 | 0.37 | 0.40 | Absence |
| Example 18 | — | — | — | 0.42 | 0.58 | 0.71 | Absence |

TABLE 2-continued

| | | | | | | | |
|---|---|---|---|---|---|---|---|
| Example 19 | — | — | — | 0.35 | 0.52 | 0.67 | Absence |
| Example 20 | — | — | — | 0.38 | 0.55 | 0.63 | Absence |
| Example 21 | — | — | — | 0.22 | 0.25 | 0.33 | Absence |
| Example 22 | — | 200 | — | 0.29 | 0.33 | 0.45 | Absence |
| Example 23 | — | — | — | 0.20 | 0.24 | 0.30 | Absence |
| Example 24 | — | — | — | 0.29 | — | 0.46 | Absence |
| Example 25 | — | — | — | 0.31 | 0.35 | 0.52 | Absence |
| Example 26 | — | — | — | 0.32 | — | 0.54 | Absence |
| Example 27 | — | — | — | — | 0.35 | 0.47 | Absence |
| Example 28 | — | — | 300 | — | 0.48 | 0.50 | Absence |
| Example 29 | — | — | 200 | — | 0.40 | 0.58 | Absence |
| Example 30 | — | — | 100 | — | 0.27 | 0.41 | Absence |
| Example 31 | — | — | 100 | — | 0.37 | 0.55 | Absence |
| Example 32 | — | — | 100 | — | 0.39 | 0.57 | Absence |
| Example 33 | 100 | — | — | — | 0.24 | 0.35 | Absence |
| Example 34 | — | 200 | — | — | 0.37 | 0.67 | Absence |
| Comparative Example | — | — | — | — | 0.22 | 0.24 | Absence |
| Reference Example 2 | — | — | — | — | 0.48 | 0.60 | Presence |

Note)
Artificial sand (A + B) is mixed sand in which artificial casting sand A and artificial casting sand B are mixed at a mass ratio of 1.

5. Confirmation Test of Depowder Performance

A hydraulic composition for an additive manufacturing device according to the composition shown in Table 3 was produced by using calcium aluminate having the Blaine specific surface area of 2,000 cm$^2$/g, super jet cement, artificial casting sand A, and hydrophobic fumed silica. Next, a pipe having an inner diameter of 15 mm and a length of 82.5 mm in a state in which the unhardened hydraulic composition was clogged by molding under the same production conditions as the mortar specimen was obtained.

Next, air was blown toward the inside of the pipe at a constant wind speed, and the time until the inside of the pipe was ventilated from air supply start was measured. In addition, the flexural strength of the mortar specimen was measured when 24 hours has elapsed after hardening. These results are shown in Table 3.

As shown in Table 3, the hydraulic composition including the hydrophobic fumed silica can shorten the time to ventilation to ⅔ or less and has high depowder performance, and the strength of the molded product is equal or higher, as compared with the hydraulic composition not including the hydrophobic fumed silica.

TABLE 3

| | CA (g) | SJC (g) | Artificial casting sand (A) (g) | FS (g) | Ventilation period (second) | Flexural strength (MPa) |
|---|---|---|---|---|---|---|
| Example 35 | 900 | 100 | 2000 | 9 | 18 | 0.88 |
| Example 36 | 900 | 100 | 2000 | 15 | 14 | 0.70 |
| Example 37 | 900 | 100 | 2000 | — | 27 | 0.71 |

The invention claimed is:

1. A hydraulic composition for an additive manufacturing device, comprising:
   a binder having 90 to 100% by mass of calcium aluminate and 0 to 10% by mass of a cement, and
   0.5 to 10 parts by mass of anhydrous gypsum based on 100 parts by mass of the calcium aluminate,
   wherein the hydraulic composition is capable of being molded by the additive manufacturing device into a plurality of shapes arranged in horizontal planes with reduced gas generation defect and with reduced graphite spheroidization defect.

2. The hydraulic composition for an additive manufacturing device according to claim 1, wherein 100 to 400 parts by mass of sand is further contained with respect to 100 parts by mass of the calcium aluminate.

3. The hydraulic composition for an additive manufacturing device according to claim 1,
   wherein 100 to 400 parts by mass of sand is contained with respect to 100 parts by mass of the binder,
   the calcium acuminate has a molar ratio of CaO/Al$_2$O$_3$ from 1.5 to 3.0; and
   the cement has a content of calcium silicate of 25% by mass or more.

4. The hydraulic composition for an additive manufacturing device according to claim 2, wherein the sand is one or more selected from silica sand, olivine sand, and artificial sand.

5. The hydraulic composition for an additive manufacturing device according to claim 1, further comprising as a hardening accelerator, one or more selected from alkali metal carbonate salt, alkali metal lactate salt, alkaline earth metal lactate salt, and alkali metal silicate salt.

6. The hydraulic composition for an additive manufacturing device according to claim 1, wherein the calcium aluminate is amorphous calcium aluminate.

7. The hydraulic composition for an additive manufacturing device according to claim 1, wherein 0.1 to 1.0% by mass of hydrophobic fumed silica is contained.

8. A process for producing a casting mold, wherein the casting mold is produced by using an additive manufacturing device and the hydraulic composition for an additive manufacturing device according to claim 1.

9. A hydraulic composition for an additive manufacturing device according to claim 1, comprising:
   100 to 400 parts by mass of sand with respect to 100 parts by mass of the binder containing 90 to 95% by mass of (A) the calcium aluminate and 5 to 10% by mass of (B) the cement as follows:
   (A) the calcium aluminate having a molar ratio of CaO/Al$_2$O$_3$ from 1.5 to 3.0; and
   (B) the cement having a content of calcium silicate of 25% by mass or more,
   wherein a total content of the calcium aluminate and the cement is 100% by mass, and wherein the hydraulic composition is molded by the additive manufacturing device into the plurality of shapes arranged in horizontal planes with reduced gas generation defect and with reduced graphite spheroidization defect.

10. The hydraulic composition for an additive manufacturing device according to claim 9, comprising gypsum in an amount of 0.5 to 10 parts by mass with respect to 100 parts by mass of the calcium aluminate.

11. The hydraulic composition for an additive manufacturing device according to claim 10, wherein the gypsum is in a state of being contained in cement.

12. The hydraulic composition for an additive manufacturing device according to claim 9, wherein a setting (initial set) of the cement measured according to JIS R5210 is within 3 hours 30 minutes.

13. The hydraulic composition for an additive manufacturing device according to claim 9, wherein the sand is one or more selected from silica sand, olivine sand, and artificial sand.

14. The hydraulic composition for an additive manufacturing device according to claim 9 comprising, as a hardening accelerator, one or more members selected from the group consisting of alkali metal carbonate salt, alkali metal lactate salt, alkaline earth metal lactate salt, and alkali metal silicate salt.

15. The hydraulic composition for an additive manufacturing device according to claim 9, wherein the calcium aluminate is amorphous calcium aluminate.

16. A process for producing a casting mold, wherein the casting mold is produced by using the hydraulic composition for an additive manufacturing device according to claim 9.

17. A hydraulic composition for an additive manufacturing device according to claim 1, comprising:
   100 to 400 parts by mass of sand,
   100 parts by mass of the binder containing 90 to 95% by mass of (A) the calcium aluminate and 5 to 10% by mass of (B) the cement as follows:
   (A) the calcium aluminate having a molar ratio of $CaO/Al_2O_3$ of 1.5 to 3.0; and
   (B) the cement containing 25% by mass or more of calcium silicate, and 0.5 to 10 parts by mass of gypsum with respect to 100 parts by mass of the calcium aluminate,
   wherein the hydraulic composition is molded by the additive manufacturing device into the plurality of shapes arranged in horizontal planes with reduced gas generation defect and with reduced graphite spheroidization defect.

18. The hydraulic composition for an additive manufacturing device according to claim 17,
   wherein the sand is one or more selected from silica sand, olivine sand, and artificial sand, and
   wherein a setting (initial set) of the cement measured according to JIS R5210 is within 3 hours 30 minutes.

* * * * *